US011234310B2

(12) United States Patent
Gommans et al.

(10) Patent No.: US 11,234,310 B2
(45) Date of Patent: Jan. 25, 2022

(54) LED DRIVER AND METHOD

(71) Applicant: EldoLAB Holding B.V., Son en Breugel (NL)

(72) Inventors: Nicolaas Johannes Antonius Gommans, Son en Breugel (NL); Franciscus Bernardus Marie Van Horck, Son en Breugel (NL); Marc Saes, Eindhoven (NL)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 16/648,452

(22) PCT Filed: Sep. 20, 2018

(86) PCT No.: PCT/NL2018/050623
§ 371 (c)(1),
(2) Date: Mar. 18, 2020

(87) PCT Pub. No.: WO2019/059767
PCT Pub. Date: Mar. 28, 2019

(65) Prior Publication Data
US 2020/0229278 A1    Jul. 16, 2020

(30) Foreign Application Priority Data
Sep. 20, 2017   (NL) ...................... 2019587

(51) Int. Cl.
*H05B 45/34*    (2020.01)
*H05B 47/105*   (2020.01)
(Continued)

(52) U.S. Cl.
CPC ........... *H05B 45/385* (2020.01); *H05B 45/34* (2020.01); *H05B 45/54* (2020.01)

(58) Field of Classification Search
CPC ....... H05B 45/34; H05B 45/50; H05B 45/385
See application file for complete search history.

(56) References Cited

U.S. PATENT DOCUMENTS

2010/0327835 A1 * 12/2010 Archibald ............. H05B 45/50
                                                         323/282
2011/0019446 A1 *  1/2011 Wu ................... H02M 3/33523
                                                          363/79
(Continued)

FOREIGN PATENT DOCUMENTS

DE   102011112455 A1   3/2013
WO      2008022270 A2   2/2008

OTHER PUBLICATIONS

Netherlands Search Report for NL Application No. 2019587, dated Feb. 27, 2018, 10 pages.

*Primary Examiner* — Henry Luong
(74) *Attorney, Agent, or Firm* — RatnerPrestia (57) ABSTRACT

An LED driver comprises a current source and a power supply configured to provide a power supply output voltage to the current source. The LED driver further comprises a controller configured to measure a voltage drop over the current source and to generate a feedback signal in response to the measured voltage drop. The power supply comprises a power supply regulator configured to regulate the power supply output voltage of the power supply between a minimum power supply output voltage and a maximum power supply output voltage, the power supply regulator comprising a power supply regulator input.
The feedback signal is provided to the power supply regulator input, in a range from a first feedback signal value representing a minimum power supply output voltage to a second feedback signal value representing a maximum power supply output voltage.
At a start-up of the LED driver, the controller provides the feedback signal at the first feedback signal value, and the
(Continued)

power supply regulator, in response to receiving the first feedback signal value, controls the power supply to provide the minimum power supply output voltage.

16 Claims, 2 Drawing Sheets

(51) Int. Cl.
  *H05B 47/10* (2020.01)
  *H05B 45/385* (2020.01)
  *H05B 45/54* (2020.01)

(56) References Cited

U.S. PATENT DOCUMENTS

| | | |
|---|---|---|
| 2011/0043133 A1* | 2/2011 | Van Laanen ......... H05B 45/355 315/294 |
| 2012/0223649 A1 | 9/2012 | Saes et al. |
| 2015/0216009 A1 | 7/2015 | Lee et al. |

* cited by examiner

LED DRIVER AND METHOD

RELATED APPLICATIONS

This application is a U.S. National Phase Patent Application of International Application No. PCT/NL2018/050623, filed Sep. 20, 2018, which claims priority to Netherlands Application No. NL 2019587, filed Sep. 20, 2017, the disclosures of which are entirely incorporated herein by reference.

The invention relates to an LED driver and to a method of driving at least one LED.

WO2008/022270 discloses an LED driver that comprises a power supply which converts an input supply voltage into a power supply output voltage. The LED driver further comprises a current regulator which is connected to the power supply to be powered by the power supply. The current regulator generates from the power supply output voltage, an LED current to drive the LEDs at the LED current.

Generally, the LED supply voltage as supplied by the power supply is required to exceed a voltage drop over the LEDs by some amount, namely at least an amount required to allow the current regulator to operate. As the intensity of the LEDs tends to vary over time, e.g. due to intensity modulation, temperature change, etc., some excess voltage is commonly supplied by the power supply in order to ensure that a sufficient voltage margin is available in case the voltage over the LEDs would suddenly rise.

Furthermore, WO2008/022270 discloses a control circuit which controls the power supply that provides the power supply output voltage. The control circuit measures the amount of headroom voltage across the current regulator, and if the headroom voltage exceeds a threshold, the input voltage as provided by the power supply is reduced accordingly. Hence, excess voltage over the current regulator and excess power dissipation in the current regulator may be reduced.

Thus, WO2008/022270 regulates the power supply voltage down thereby to prevent excess dissipation by the current source, thus increasing an overall energy efficiency of the LED driver.

The invention intends to provide a further improved LED driver.

According to an embodiment of the invention, there is provided an LED driver for driving at least one LED, the LED driver comprising
  a current source configured to generate an LED drive current, and
  a power supply configured to provide a power supply output voltage to the current source,
the LED driver further comprising a controller configured to measure a voltage drop over the current source and to generate a feedback signal in response to the measured voltage drop, the power supply comprising a power supply regulator configured to regulate the power supply output voltage of the power supply between a minimum power supply output voltage and a maximum power supply output voltage, the power supply regulator comprising a power supply regulator input,
wherein the feedback signal is provided by the controller to the power supply regulator input, the controller being configured to provide the feedback signal in a range from a first feedback signal value representing a minimum power supply output voltage to a second feedback signal value representing a maximum power supply output voltage,
wherein the controller is configured to at a start-up (e.g. of the controller of the LED driver) provide the feedback signal at the first feedback signal value, and
wherein the power supply regulator is configured to, in response to receiving the first feedback signal value, control the power supply to provide the minimum power supply output voltage.

As a light output of an LED generally relates to the LED current, LEDs are commonly driven by a current source that provides an LED drive current. The LED current source and the LED are powered by a supply voltage. In order to provide a regulated supply, use may be made of a power supply that outputs a supply voltage, such as a switched mode power supply. The power supply is provided with power from e.g. a rectified mains voltage or a DC supply voltage, such as a battery voltage. The current source may for example comprise a switched mode current source or a linear current source. As the current source and the at least one LED may be series connected, the current source may be connected to ground, i.e. the at least one LED floating between the power supply output and the current source, or the at least one LED may be grounded, i.e. the current source floating between the power supply output and the at least one LED.

The power supply comprises a regulator, such as an output voltage regulator which for example controls a periodic switching in the case of a switched mode power supply. For example, the regulator controls an output voltage of the power supply, i.e. the power supply output voltage, towards a certain value. As another example, the regulator controls an output power of the power supply, i.e. the power supply output power, towards a certain value. As yet another example, the regulator controls an output current of the power supply, i.e. the power supply output current, towards a certain value. The regulator comprises a regulator input and may be configured to control the power supply to provide that the output voltage of the power supply is regulated to be in a range between a minimum power supply output voltage and a maximum power supply output voltage. The LED driver further comprises a controller which generates a feedback signal. The feedback signal is provided to the regulator input. The controller is configured to measure a voltage drop over the current source. The controller thereto comprises a voltage measurement input, such as a differential voltage measurement input in case the current source is floating or a single ended voltage measurement input in case the LEDs are floating and the current source is connected to ground. The controller may accomplish further tasks, such as controlling the current source to provide a desired current, control switches to connect/disconnect one or more of the LEDs, the providing of a desired current and the connecting/disconnecting of the LEDs may serve to set an LED intensity and/or colour by setting an LED current, LED modulation, etc. The controller may be configured to generate the feedback signal proportionally to an input of the controller (such as the voltage measured at the voltage measurement input of the controller). Alternatively, the controller may exhibit a proportional and differential behaviour. As a further embodiment the controller may make use of prediction, such as extrapolating the controller input signal. In an embodiment, the controller may exhibit a non-linear behaviour, e.g. offset or step-response, e.g. to compensate for properties of the power supply and/or the headroom voltage measurement circuit.

The current source may comprise any back end power supply that provides an LED drive current, such as a back end power supply that is configured to provide a constant current output (largely independent of output voltage), or a back end power supply that is configured to provide a constant output power (the product of output current and output voltage being controller), or a back end power supply that is configured to provide a constant output voltage (the output voltage being controlled), the latter for example in combination with a series resistor or other current control circuitry. As an intensity of an LEDs may in many cases be largely dependent on the LED current, the term current source is generally applied, which term may be considered to include other back end power supply types. Thus, the term current source may be understood to comprise any back end power supply configured to power the LEDs. Accordingly, the terms power supply and current source may also be referred to as front end power supply and back end power supply respectively.

According to an aspect of the invention, the controller is configured to, at a power-up, i.e. at a start-up, initially provide the feedback signal at the first signal value that causes the minimum power supply output voltage. The regulator of the power supply is configured to, when receiving the feedback signal at the first (minimum) signal value, control the power supply to provide the minimum supply voltage. The first feedback signal value that represents the minimum power supply output voltage may form the minimum feedback signal value and the second feedback signal value that represents the maximum power supply output voltage may form the maximum feedback signal value. Hence a defined, start-up behaviour is provided in that the power supply voltage is initially kept at a lowest value when the driver is powered up. In the case of a proportional and differential behaviour of the controller, the controller may be configured to set the feedback signal initially so as to control the power supply to provide the minimum supply voltage. In order to provide a smooth start-up behaviour, thus preventing the differential behaviour of the controller to trigger a change in the power supply output voltage, keeping the feedback signal at a steady state for a start-up time and/or keeping the controller input signal at a stationary level for a start-up time, may be provided, A proportional control by the controller may suffice, e.g. in a situation where the controller is able to calculate the required power supply output voltage in time.

According to the invention, it may be provided that, at a malfunction of any component or circuit in the feedback path, the feedback signal returns to the first feedback value so that the output power under the malfunction condition is at or below a maximum allowed value, e.g. a maximum as required by standards for the particular type of equipment. It is noted that there may be many possible malfunctions which can be considered leading to Stuck-At-1 (SA1) or Stuck-At-0 (SA0) or to "open connections" that no longer connect or to switches that are shorted or connections (short circuits) where there should be none. Considering such SA1, SA0, Open, Short possibilities may include situations where the feedback signal is pulled to its second feedback signal value causing an undesirable situation. Accordingly, the proposed circuit/method aims to create an inherently safe situation for most of these malfunctions.

Some common Single Point Of Failures (SPOFs) may be:
1) Shorted MOSFET in the current source
2) No longer operating processor
3) Too low light in the optocoupler e.g. due to marginal design combined with extreme temperatures In the case of for example SPOF2 and SPOF3, the present invention may (intrinsically) regulate the power supply output to a safe value, hence keeping the LED driver within its safe operating limits. In the case of SPOF1, the controller may sense a voltage over the LEDs and the power supply output voltage, determine a difference there between and determine that the MOSFET switch in the current source may be short circuited when a value of the difference is too low and may control the feedback signal to have the first feedback signal value.

In the prior art control circuit, at power-up, due to the fact that no or little feedback signal is generated, the regulator will operate the power supply to rise the power supply output voltage towards the maximum power supply output voltage. At a later stage in the start-up, the feedback signal will come into action and possibly regulate the power supply voltage back towards a lower value. For example, the prior art LED driver may be arranged to suit a wide range of forward LED voltages. Accordingly, the prior art LED driver may be arranged to initially set the power supply output voltage at a high value in order to be able to power an LED assembly that requires a high forward LED voltage. When the driver detects that such a high value may not be required by the LED assembly that is actually connected to the driver, the driver may control the power supply output voltage downward. This prior art behaviour may, apart from safety aspects, provide for an initial negative impact on a stability of light irradiated by the LEDs. Accordingly, at start-up, i.e. when the driver has been powered up and starts operating, the prior art power supply will initially tend towards maximum output voltage, and will only be controlled back to a lower value, if required, once the controller generates the feedback signal at a value that makes the regulator to reduce the power supply output voltage.

According to the invention, at start-up of the driver, the power supply keeps the value of the power supply output voltage at or near the first (minimum) value of the power supply output voltage. On the one hand, the controller is configured to, at start-up, provide the first (minimum) value of the feedback signal. On the other hand, the regulator is configured to, at start-up, provide the minimum power supply output voltage in response to the receipt of the feedback signal at the first (minimum) value and/or in response to receiving no feedback signal at all (as may be the case when the controller has not powered up yet, is still in a process of initializing or in the case of an error, such as a short circuit, broken connection etc. which may impede a functioning of the controller). In case the controller comprises a microcontroller or other programmable device, the controller may implement this behaviour in that it is provided with program instructions that provide that, at start-up, the feedback signal is kept at the first value. The controller may keep the feedback signal at the first value during a predetermined time period, and/or until the LED current reaches a predetermined value. There may be no LED current at all when the initial minimum voltage is lower than the total Vf across the LEDs and the current source. Hence, the controller may have to either gradually increase the feedback signal until it starts measuring LED-current or a minimum headroom voltage [with the possibility to remember the minimum voltage where there was a minimum LED current to use it to set the corresponding feedback signal as initial value after start-up on the next and following start-ups.]. Alternatively, the controller may be configured with all LED-group Vfs in an application (where the connected LEDs are known) and calculate the initial feedback value based on these configured Vf's plus the initial set-point and the therefrom derived knowledge which LEDs will be ON and thus what total Vf will result.

A learning algorithm could be applied, as follows: The driver could be put in a mode in which it learns what LEDs (and their Vfs) are connected by keeping the minimum voltage low (say below minimum voltage drop across the current source +2V for the 1 LED and still not have an LED current (assuming power-LEDs minimum voltage is 2.5V). Then go through all switch positions that enable 1 LED group in series, increase the voltage and learn the Vf once LED current starts flowing. When a colour sensor would be added, also the group colour could be measured and in many applications the driver would discover the LEDs automatically.

In case the controller is implemented by an analogue controller circuit, comprising e.g. an error amplifier, the circuit may be designed to at power up, keep the feedback signal at a low value. In case the controller is implemented by a digital controller circuit, comprising e.g. a microprocessor, the controller may be arranged (e.g. provided with program instructions) to keep the feedback signal at a low value at power up.

Similar considerations apply to the regulator. When implemented using a microcontroller or other programmable device, the regulator may be provided with program instructions that provide that, initially, the regulator controls the power supply to provide the first (minimum) power supply output voltage, e.g. for a predetermined start-up time period. When the regulator is implemented by means of an analogue control circuit, the circuit may be designed to drive the power supply to at start-up keep the power supply output voltage low. This may be achieved for example by having a capacitor without charge at start-up causing the minimum output voltage to occur after which the capacitor may charge up to the feedback voltage to get the desired value, while causing a fast discharge of that capacitor at power-off to obtain a discharged capacitor at next start-up. Normal regulation principles apply here to control a value towards its setpoint value, such as P, PD, PID, etc.

The feedback signal may be an analogue feedback signal or a digital feedback signal.

In an embodiment, the regulator is configured to, when receiving no feedback signal from the controller, control the power supply, to provide the minimum power supply output voltage Also, in some cases the driver comprises two modules that are interconnected to provide the driver functionality. One module may comprise a power supply and other functions such as delivering a constant current during the entire modulation cycle where the other module distributes the current to the different groups (and this can both be done at different current levels during different subparts of the modulation cycle). The other module may comprise the current source and possibly switches, such as parallel switches that enable to activate and deactivate one or more of the LEDs, thus enabling modulation schemes. Hence, functions that are mode specific to the LEDs as applied (the LED current and modulation) may be implemented in one module, while more generic functions, such as the generation of the power supply voltage, may be implemented in the other module. In case of a defect, such as a defective connection or a defective communication between the modules, the regulator receives no feedback signal, and may keep the power supply output voltage at a low level, hence adding to a level of intrinsic safety of the LED driver. Other functions may be provided in the modules: Power Factor Compensation/control, which, in case of Power Line communication, may be provided in the first module. Switched dim (controlling intensity using the power switch) may be provided in one of the modules. Furthermore, the start-up times of the power supply and the current source may differ, e.g. depending on load conditions, such as the amount and types of LEDs connected to the current source. Thus, a situation could occur where the power supply and regulator would already be in operation, while the controller and/or current source would still be in a process of initialisation or power-up, etc. As a result, the power supply would operate during some transitory time without receiving a feedback signal. Again, the present embodiment enables to keep the power supply output voltage at the minimum value during such transitory phase.

a) When the power supply and regulator are intrinsically safe, that is they deliver minimum voltage when there is no feedback signal, no feedback is likely that the feedback controlling output pin on the controller's processor=0V, and the initial feedback signal coming from the controller starts at the safe side of the value causing minimum output voltage, then there may be no need for the power supply/regulator to distinguish between start-up and normal operation. The controller is not yet active and therefore cannot distinguish between start-up and operational and may have its outputs in tri-state. Using a pull-down resistor the pin controlling the feedback may be pulled to 0 V which would be a safe value.

b) Once the controller is through its internal initialisation (including activating its output pin at a safe value to cause the minimum supply voltage), it shall start executing the normal functions among which the control algorithm for generating the feedback signal based on (a.o.) measurement of the LED current(s). The controller shall always start giving the feedback signal in principal starting from the value causing a minimum output voltage or at the safe side of that value. In a typical practical case that would be 0V; note that the uC may use an analogue voltage or a pulsed digital voltage or a pulsed analogue voltage to control feedback, depending on what is in the feedback circuit. It may however rise from that starting level to the required operational level infinitely fast (bounded by physical properties in a real life circuit). The controller will either know which LEDs are connected through certain configuration values having been set for the application, or it may discover the LEDs which are connected using a discovery method. In case the controller knows the LEDs and there Vf (possibly depending on how it controls any parallel or topology changing switches), it can calculate the feedback signal from that, set the feedback signal and tune it to a target LED current level once it receives valid current measurement signal(s). In case the controller does not bear knowledge of the connected LEDs it can start at the minimum voltage and enlarge that by manipulating the feedback signal until current starts to flow.

c) The invention may be employed to mitigate an effect of a SPOF (Single Point Of Failure) or MPOF (Multiple Point Of Failure) somewhere in the circuit, which would otherwise cause a high output power, e.g. in excess of allowable safety power limits. A SPOF could be a halt of the execution of the feedback control function by the processor. The SPOF could for example be caused by a uC oscillator that has stopped, an internal infinite software loop (which may typically be resolved by the watchdog function, but may take some time), a too hot uC becoming defective, a bad soldering which leads to malfunctioning contacts after some time, etc.

Thus, when the driver is started up, i.e. when operation of the driver is started, a safe situation may be provided in a variety of phases: when the controller is not running yet, while the power supply is running, the driver keeps the regulator input voltage at the first feedback signal value, thus causing the power supply to provide the minimum power supply output voltage. A similar, behaviour will occur when the power supply is running while the feedback signal is absent, e.g. due to a defect of the controller, a defect of a connection between the controller and the regulator, etc. Furthermore, when the controller has started operation and does generate a feedback signal, the controller will initially, i.e. after having started operation, provide the first feedback signal value, thus to signal to the power supply to provide the minimum power supply output voltage. Thus, initially, in each one of the above situations, a generation of higher output voltages by the power supply is prevented, thus providing a more safe, well defined start-up behaviour.

It is noted that throughout this document, the terms start-up, start up, power up and power-up are to be understood as the electrical power being applied, causing the circuit that is powered-up to come into operation. The power-up of an electronic device may imply that the device will start to operate by electrical/electronic components thereof being energized. For a programmable device, such as a controller, e.g. a microcontroller, the term power-up and start-up may further imply that the programmable device performs an initialisation routine, in order to bring the programmable device into its regular operating mode (such as a start-up sequence, a boot sequence, an initialisation, etc.).

In an embodiment, a power supply terminal of the controller is connected to a power supply output of the power supply to be powered by the power supply output voltage, the LED driver being configured to:
start an operation of the power supply when a power supply input voltage to power the power supply is applied to the power supply, the starting of the operation of the power supply providing that the power supply output voltage rises, start an operation of the controller when the power supply output voltage has risen to a minimum level required to power the controller,
the controller being configured to initially provide the first feedback signal value representing the minimum power supply output voltage, when the controller has been powered-up from the power supply output voltage.

Accordingly, when the controller is powered by the power supply, a safe operation at low power supply output may be provided in succession: when the power supply starts operation, i.e. is powered-up, it will, in the absence of a feedback signal, increase the output voltage from zero towards the minimum power supply output voltage. As of a certain power supply voltage, the controller will start-up and after being initialized, loading and running software, at first generate the first feedback signal value.

The controller may, when initially generating the first feedback signal value, wait for a predetermined settling time before taking any further control action to control the power supply output voltage.

The driver may be designed to intrinsically keep the regulator input at the first feedback signal value. For example, the first feedback signal value may be set to 0 Volt, whereby the regulator may be configured to keep the regulator input at 0 Volt when no feedback signal is provided. As an example, the feedback signal may be provided by the controller via an opto-coupler, whereby the absence of a feedback signal provides a 0V input signal to the regulator. Alternatively, a regulator input circuit may be provided to force the regulator input to the first feedback signal value when receiving no feedback signal, the regulator input circuit may for example comprise a pull down resistor (in case the first feedback signal value is formed by a low voltage, e.g. 0 Vi, a pull up resistor in case the first feedback signal value is formed by a high voltage, e.g. a logic high voltage level or a maximum of an analogue input voltage range, such as 5V or 10V continuous or pulsed mode). For example, the controller may have a tri-state output, whereby, when the controller is not in an operational, running state, the tri-state output is in a high impedance state, the regulator input circuit may ensure that the first feedback signal value is provided to the regulator input, e.g. when the tri-state controller output is in the high impedance state. The regulator input circuit may also ensure that the appropriate, safe behaviour of the power supply is provided when no feedback signal is provided, e.g. due to an error, such as a broken connection, incorrect wiring, error state of the controller, etc.

In an embodiment, the controller is further configured to:
measure a voltage over the at least one LED,
compare the measured voltage over the at least one LED to a minimum expected value of the voltage over the LED, and
increase the value of the feedback signal when the voltage over the LED is below the minimum expected value.

Starting from the initial condition whereby the output voltage of the power supply is at its minimum value, the controller may measure the voltage over the LED, in order to establish if the voltage is sufficient or not. As an alternative, the controller may measure light or measure current, such as LED current. Again there may be two possible modes: a) Load is known to the controller, for example through configuration settings, or b) discover what the load is. This last method may be more difficult depending on what input data can be obtained from the LED fixture through measurement (current, light characteristics) or through auto-configuration by reading an LED-fixture ID and requesting control settings/parameters from a database.

A possibility is having a nominal LED current set as configuration value and increase the supply voltage via the feedback signal until current starts to flow and then control it to the nominal value, or, as described earlier, set the feedback signal to the required value immediately based on configuration settings and tune once current is measured. Once the nominal current is measured the processor knows the relationship Inom–feedback signal and may rely on that factor until the next power off or until a next explicit calibration request.

After that non-nominal LED currents can be set by the controller as necessary, e.g. for VLC (visual light communication) modulation.

At the minimum power supply output voltage, the LEDs may either be conducting, namely in case the minimum power supply output voltage would be sufficiently high for the LEDs to operate at the LED drive current, or the minimum power supply output voltage could be insufficient for the LEDs to start operating at the LED drive current. As the LED configuration (number and type of LEDs, as well as series/parallel connections) that is connected to the LED driver may be unknown to the driver, the voltage that would be required to operate the LEDs at the LED drive current, may be unknown to the driver. Hence, the driver may, starting from the minimum power supply output voltage, gradually increase the voltage until the LEDs start operating.

Alternatively, or in addition thereto, the controller may be configured to
measure the current through the at least one LED,
compare the measured LED current to a setpoint LED drive current, and
increase the value of the feedback signal when the measured LED current is below the setpoint LED drive current. Hence, the controller may measure an LED drive current (being the current source output current) and compare the measured LED drive current to a setpoint LED drive current. In case the measured LED drive current is below the setpoint LED drive current, the power supply voltage may need to be increased, as the present value of the power supply voltage may be insufficient to allow the LEDs and the current source to operate according to the setpoint LED drive current. In order to allow the current source to operate the LEDs at the LED setpoint current, a power supply voltage would have to reach at least a forward conductive voltage over the LEDs plus a minimum voltage drop across the current source to enable the current source to operate at the intended operating current Alternatively, the controller may control the current source to operate at a predetermined current, which is expected to be above the knee in the I/U curve of the LEDs, and measure a remaining voltage over the current source. In case the voltage over the current source takes a large part of the power supply voltage, this may indicate that the LED is still off, and the controller may increase the feedback signal and provide that the regulator regulates the power supply to a higher value.

In an embodiment, the controller is further configured to: measure a current through the at least one LED, and derive the expected value of the voltage over the LED from the measured current through the at least one LED.

For example, the controller may drive the current source to gradually increase the LED drive current. At the same time, the controller may measure the LED forward voltage drop. As the LED exhibits a "knee" in the I/U characteristic, i.e. the forward voltage drop of the LEDs will first rise quickly, as the current starts to increase, and grow slowly as the "knee" in the I/U curve is reached. Having detected the voltage at which the knee in the curve takes place, the controller may derive therefrom how much the voltage drop over the LED would be in normal circumstances. For example, when connecting multiple LEDs in series, the effective knee voltage over the series connection will increase, likewise to an increase in the voltage drop over the series connection of LEDs in operation. Hence, the expected value of the voltage over the LED may be derived by the controller. Other ways to derive the expected value of the voltage over the LED may comprise measuring light and LED forward voltage while increasing current, querying context of the driver from an application master (typically via a network), the application master may be composed of multiple masters with specific roles such as a configuration-master, and/or: sending a spike current through the LEDs and measure peak voltage that occurs.

In an embodiment, the driver comprises a plurality of parallel switches, each parallel switch to be connected in parallel to a respective at least one of the LEDs, the controller being configured to operate the switches so as to modulate the LEDs in accordance with a desired LED output, the controller being configured to determine an operating value of the power supply output voltage by
  driving the parallel switches to operate in a non-conducting state,
  the (step of) increasing of the value of the feedback signal when the measured LED current is below the setpoint LED drive current being performed when the parallel switches are in the non-conducting state,
  storing a required value of the power supply output voltage as required to achieve the LED setpoint current in a memory of the controller. Parallel switches may be applied to modulate the LEDs. Each LED or each group of LEDs (e.g. each group of LEDs at a specific colour) may be provided with a parallel switch. In conductive state of the respective parallel switch, that parallel switch will bypass the respective LED or group of LEDs, so that the current of the current source flows through the parallel switch instead of through the LED or group. Hence, by activating/de-activating the parallel switches into the conducting/non-conducting state, the LEDs may be modulated. As a result, the required operating voltage of the series connected (groups of) LEDs, may reduce, when parallel switches are conducting. In order to provide that the power supply operates at a power supply output voltage that is high enough, the discovering of the required power supply output voltage is performed when the switches are non-conducting, so that the LEDs are all on.

The controller may further be configured to change the feedback signal from the first feedback signal value to a feedback signal value that represents the stored required value of the power supply output voltage after the controller has been started-up and has reached the first feedback signal value, so as to drive the regulator to increase the power supply output voltage from the minimum power supply output voltage to the required value of the power supply output voltage. Thus, following the safe start procedure whereby the power supply output voltage is kept at the minimum power supply output voltage, the power supply output voltage may increase towards e.g. the required value in case all LEDs would be activated. The transition may for example take place after a predetermined time or after the controller has established that the first feedback signal value is output to the regulator.

The controller may be configured to, when the required value of the power supply output voltage has been stored in the memory,
  operate the power supply to remain at or above the required power supply output voltage when at least one of the parallel switches is in the conductive state. Thus, the power supply is kept at the power supply output voltage that would be required to keep all LEDs on. A quick change, and associated charging/discharging of a power supply output capacitor of the power supply is thereby avoided. Also, relatively complex modulation of the LEDs is made possible as no account needs to be taken of time required for the power supply to adapt to a change in the required output voltage as a result of changes of the states of the parallel switches. Alternatively, the controller may be configured to, when the required value of the power supply output voltage has been stored in the memory,
  determine a reduced power supply output voltage in accordance with a state of the parallel switches,
  operate the power supply at the reduced power supply output voltage. Hence, a highly power efficient operation may be achieved as the power supply output voltage is adapted as needed, causing excess voltage over the current source, and associated power consumption, to be avoided. The controller may derive the reduced power supply output voltage from a setpoint LED intensity in combination with the modulation scheme and/or from a sequence of switching of the parallel switches.

In an embodiment, the controller is configured to compare the measured voltage drop over the current source with a threshold value, and to increase the value of the feedback signal when the measured voltage drop is below the threshold value, the regulator being configured to drive the power supply to increase the power supply output voltage in response to an increase in the value of the feedback signal.

The voltage over the current source may be kept to a minimum value for various reasons. First, the current source (linear or switched mode) may require a certain voltage drop to operate satisfactorily. Secondly, the voltage over the LEDs may change somewhat due to various causes, such as an increase in LED drive current, a change of LED temperature causing the LED voltage forward voltage drop to change, or a change in the configuration of the LEDs due to the opening and/or closing of parallel or series switches causing a configuration of the LEDs to change. In order to take account of a possible increase in LED forward voltage drop, some margin in the voltage drop over the current source may be desired, so as to accommodate the increase in LED forward voltage by a corresponding decrease in voltage drop over the current source.

In an embodiment, the controller is configured to compare the voltage drop over the current source to an upper threshold and to reduce the power supply output voltage when exceeding the upper threshold. The upper threshold may be set to reduce dissipation by an excessive voltage drop over the current source. Hence, in case the voltage drop over the current source appears to be more than necessary, the controller may drive the regulator, by means of the feedback signal value, to reduce the power supply output voltage. The controller may repeatedly detect if the voltage drop exceeds the upper threshold or not, and keep controlling the regulator to reduce the power supply output voltage until the condition of exceeding the upper threshold has been departed.

The feedback signal comprises an analogue feedback signal or a digital feedback signal The feedback may for example take place via an opto-coupler, analogue feedback as well as digitally coded feedback may be applied.

According to a further aspect of the invention, there is provided a method of driving at least one LED, the method comprising:
generating by a current source an LED drive current, and
providing by a power supply a power supply output voltage to the current source,
measuring by a controller a voltage drop over the current source and generating by the controller a feedback signal in response to the measured voltage drop,
regulating by a power supply regulator the power supply output voltage of the power supply between a minimum power supply output voltage and a maximum power supply output voltage, the power supply regulator comprising a power supply regulator input,
providing by the controller the feedback signal to the power supply regulator input, providing by the controller the feedback signal in a range from a first feedback signal value representing a minimum power supply output voltage to a second feedback signal value representing a maximum power supply output voltage,
providing by the controller at a start-up (of the controller) the feedback signal at the first feedback signal value, and controlling by the power supply regulator, in response to receiving the first feedback signal value, the power supply to provide the minimum power supply output voltage.

The method may further comprise: controlling the power supply to provide the minimum power supply output voltage when receiving no feedback signal from the controller.

In an embodiment, the method further comprises:
starting an operation of the power supply when a power supply input voltage to power the power supply is applied to the power supply, the starting the operation of the power supply providing that the power supply output voltage rises, starting an operation of the controller when the power supply output voltage has risen to a minimum level required to power the controller from the power supply output voltage,
initially providing by the controller the first feedback signal value representing the minimum power supply output voltage, when the controller has been powered-up from the power supply output voltage.

In an embodiment, the method comprises setting the regulator input to the first feedback signal value when receiving no feedback signal.

With the method according to the invention and its embodiments, the same or similar advantages may be achieved as with the LED driver according to the invention. Furthermore, the same or similar preferred embodiments may be provided, achieving the same or similar effects as described with reference to the LED driver according to the invention.

Further advantages, features and effects of the invention will follow from the below description and the appended drawing, in which a non-limiting embodiment of the invention is depicted, wherein.

Figure 1:
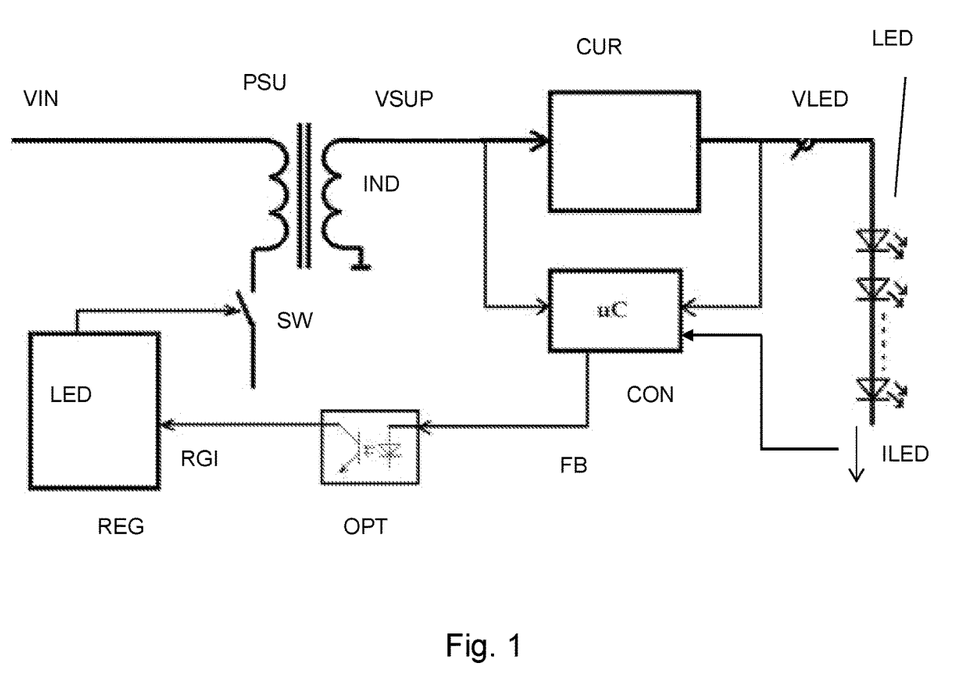
FIG. 1 depicts an LED driver based on which an aspect of the invention will be explained.

FIG. 1 depicts an LED driver in which the invention may be practiced. The LED driver comprises a power supply PSU and a current source CUR. In the present embodiment, the power supply is formed by a switched mode DC/DC converter that is schematically represented by inductor IND (in the present example a transformer) and switch SW, such as a field effect transistor. It is noted that further components of the DC/DC converter, such as a rectification diode and output buffer capacitor, and an optional output current feedback loop, have been omitted in the drawing The power supply is fed from a DC input voltage VIN, such as a rectified mains voltage or a battery voltage. The power supply further comprises a regulator REG. The regulator controls a switching of the switch SW of the power supply, such as controlling a switching duty cycle and/or a switching frequency, hence controlling an output power and/or output voltage thereof. A feedback signal FB is provided to a regulator input RGI, as described below.

The current source CUR may be formed by a linear current source, or a switched mode current source. The current source generates, from the power supply output voltage provided to it, an LED drive current ILED for driving the LEDs as connected to the output (at VLED) of the driver. For illustrative purposes, details of the (linear or switched mode) current source have been omitted in the present figure. In the present example, the LEDs are connected to ground while the current source floats between the power supply output and the positive terminal of the LEDs. It will be understood that a current measurement device (not shown), such as a current measurement resistor, may be connected in series between the LEDs and ground, in order to provide a current feedback signal to the current source. Furthermore, it will be understood that other configurations are possible, for example connecting the LEDs to float between the power supply output voltage and the current source, whereby the current source is connected between the LEDs and ground. Switches may be connected in parallel to the LEDs. Each LED or group of the LEDs may be provided with a parallel switch. The switches may comprise semiconductor switches such as field effect transistors (FET). The switches may be controlled by a controller CON of the driver, so as to provide that LEDs or groups of LEDs are switched on and off, e.g. time modulated, to achieve a desired optical output, such as a desired intensity, colour, etc.

As mentioned above, the driver further comprises a controller CON. The controller receives as input, inter alia, the power supply output voltage and the LED voltage, i.e. the voltage over the LEDs. Using one or both of these input signals, the controller generates a feedback signal FB. The feedback signal is provided to the Regulator input RGI, in the present embodiment by means of an optocoupler OPT connection. It is noted that the optocoupler connection may be desired to achieve galvanic isolation in combination with the transformer of the power supply. In case no galvanic isolation would be provided in the power supply, the optocoupler could possibly be omitted. On the one hand, the controller and regulator may provide a voltage control of the power supply output voltage: The controller measures the power supply output voltage, and generates the feedback signal to the regulator in response thereto, thus providing that the power supply voltage is regulated as desired. As the voltage drop over the current source is derived by the controller from the difference between the power supply output voltage and the LED voltage, i.e. in the present case the output voltage of the current source, the controller may provide further control options.

An initial situation after power up may be that the controller keeps the feedback signal at a value that makes the PSU deliver its minimum output voltage. Then the controller may choose to increase the output voltage. For example the controller may compare the difference between the power supply output voltage and the LED voltage to a minimum required headroom voltage and increase the power supply output voltage, by driving the regulator by means of the feedback signal so as to increase the power supply output voltage until sufficient headroom is available to accommodate dynamics of LED voltage changes, e.g. as a result of change of current, change of operating temperature and/or change of configuration due to operation of parallel and/or serial switches that act on a configuration of the LEDs.

According to an aspect of the invention, a defined start-up behaviour is provided as follows. The start-up may be defined in this document as a time period during which the driver is powered up, i.e. a time period during which the driver is in a process of stabilizing its operation towards a steady ON state, in which the circuit operates and in which feedback loop(s) have established operation. When the driver starts operation, the power supply will initially raise the output voltage from zero, and as of reaching a certain level, the current source will be provided with sufficient voltage to start operating. Initially, no or little feedback may be established, on the one hand as the controller (such as a microcontroller) may not have sufficient supply voltage, or may be in a process of initialisation, and on the other hand as no or only little input may be provided to the microcontroller causing it to lack relevant input to generate a meaningful feedback signal. Furthermore, the voltage over the LEDs may be insufficient yet for the LEDs to operate at the envisaged LED current. Hence, many factors may play a role to cause the feedback loop not operating properly yet during the start-up.

The inventors have devised that at start-up, the driver keeps the power supply output voltage at a lowest level. The lowest level may be defined as a lowest voltage in a range of usable power supply output voltages that may be provided by the power supply during stable operation. In order to do so, the controller is configured to generate, during the start-up phase, a feedback signal value that corresponds to the lowest power supply output voltage. Furthermore, the regulator is configured to, when receiving this feedback signal value, to control the power supply to generate the minimum power supply output voltage.

Furthermore, in order to provide this stated behaviour when the feedback is not even operating yet, i.e. when no feedback is provided, for example due to the fact that the controller is not operational yet, e.g. in its initialisation or start-up phase, the regulator may be configured to control the power supply to generate the minimum power supply output voltage in case no feedback signal is provided. The latter feature may also enhance intrinsic safety in case no feedback is provided, e.g. due to a fault.

The controller may remain in the defined start up condition, whereby the minimum power supply output voltage is provided. Then, the controller may gradually increase the power supply output voltage towards a desired value that fits the present application, i.e. the present configuration and drive conditions of the LEDs. In order to do so, the controller may measure a voltage over the at least one LED, compare the measured voltage over the at least one LED to a minimum expected value of the voltage over the LED, and increase the value of the feedback signal when the voltage over the LED is below the minimum expected value. The minimum expected value of the voltage over the LED may be fixed or may be derived by measuring the current through the at least one LED, and derive the expected value of the voltage over the LED from the measured current through the at least one LED: When the current increases, the "knee" in the voltage/current characteristic of the LEDs will be reached: hence, when increasing the current, and the voltage starts to stabilise at or near a typical forward voltage drop of the LEDs, hence the forward voltage drop only changing little as the LED current changes, the typical forward operating voltage may have been reached and applied as the minimum expected value of the voltage over the LED.

Alternatively, the controller may measure an LED drive current (being the current source output current) and compare the measured LED drive current to an LED drive current setpoint. In case the measured LED drive current is below the LED drive current setpoint, the power supply voltage may need to be increased, as the present value of the power supply voltage may be insufficient to allow the LEDs and the current source to operate according to the LED drive current setpoint.

The controller may further keep, during regular, stable operation, the voltage drop over the current source in a predefined bandwidth: in case the voltage drop would be too low a dynamic headroom would be too low, while in case the voltage drop would be too high, a power loss by the voltage drop over the current source, times the LED drive current, would be too high. Accordingly, the controller may measure the voltage drop over the current source as described above, and drive the feedback signal to provide that the regulator corrects the power supply output voltage as described.

When powering up the circuit, and applying the minimum power supply output voltage, an LED current will flow or not, depending on whether the minimum power supply output voltage exceeds a sum of a forward voltage of the LEDs plus a minimum voltage drop across the current source to make the current source operate, or not. If exceeding this sum, the minimum power supply output voltage will be high enough to make the LED(s) conduct. Otherwise, the minimum power supply output voltage will not make the LED(s) conduct, or would in principle be sufficient to make the LEDs conduct, but provide insufficient voltage drop over the current source. The first case, i.e. wherein the minimum power supply output voltage exceeds a sum of a forward voltage of the LEDs plus a minimum voltage drop across the current source to make the current source operate, may in some applications be undesired, as it would activate the LEDs directly at the beginning, which may also imply that the LEDs would be activated in the case of a fault condition, as described in some more detail elsewhere in this document. In case the minimum power supply output voltage does not exceed a sum of a forward voltage of the LEDs plus a minimum voltage drop across the current source to make the current source work, the LEDs will initially be off.

This means that the circuit will initially send no current through the LEDs as the current source and/or the LEDs have too low a voltage across it to function.

The controller may change the feedback voltage from Vfb_min towards Vfb_max until typically an LED current is measured that complies to the actual set-point. Note that in a lighting application it may take a while before light is needed and the set-point is set to a value causing an LED current to flow. The minimum value of the feedback voltage and/or the minimum value of the power supply voltage required to make the current source and LEDs operate at the desired current, may be either known to the driver or not. In case the value is not known, the required power supply output voltage may be discovered by increasing the power supply output voltage until the current source and LED(s) operate at the desired current. The value may then be stored, e.g. in a non-volatile memory in the controller for use in subsequent power on periods.

When the microcontroller is inactive, no current will flow through the LED of the optocoupler. Therefore the signal at the emitter of the transistor of the optocoupler will be 0V. The flyback-controller chip REG shall control the switch in series with the primary winding in such a manner that the secondary voltage delivered is at its minimum. When the feedback voltage at the emitter of the transistor of the optocoupler rises, the secondary voltage shall rise.

A rising feedback voltage can be achieved by putting an analogue voltage on the output pin of the uC.

When the microcontroller does not function due to i.e. a defective oscillator, its output pin will stay at tri-state and the feedback voltage will stay at 0 which is intrinsically safe.

Figure 2:
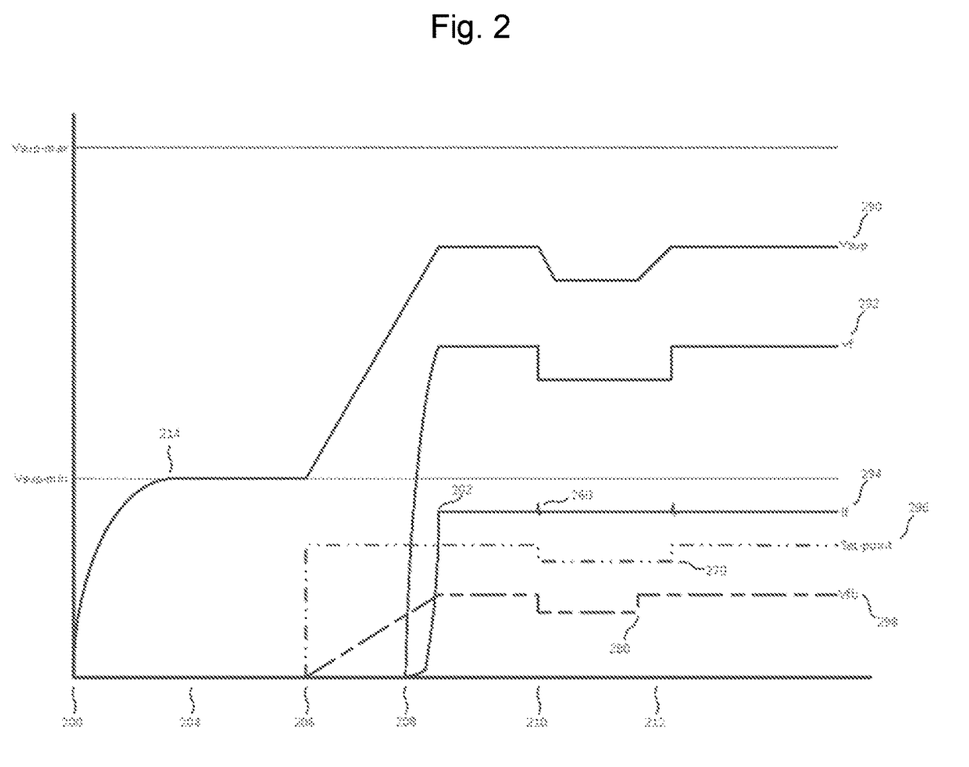
FIG. 2 depicts a time diagram of an example of signals as may occur in the circuit in accordance with FIG. 1.

FIG. 2 depicts a timing diagram of an example of signals as may occur in the circuit in accordance with FIG. 1. It is noted that the signals as depicted may be idealized to some extent for ease of explanation. An example of a behaviour of the circuit in accordance with FIG. 1 will be described below.

At instant 200 in time, the driver is powered up. At 214 the PSU output Vsup (290) has stabilized. Somewhere between 200 and 204 the supply to the controller became sufficient for the controller to start functioning. Assume the controller needs from 204 to 206 to initialize its internals and externals and that it starts operation at 206. During initialization, the feedback voltage 298 is kept at the value that causes the regulator to control the PSU output voltage Vsup to stay at its minimum value, depicted here as 0 Volt, for example by a pull down resistor. Also the internal set-point is kept at 0% to keep the LED unit from radiating uncontrolled light. During this time the externally provided set-point may be non-zero but is internally overridden until 206. The minimum power supply output voltage Vsup-min and the maximum power supply output voltage Vsup-max being depicted in FIG. 2.

At 206 the controller observes a non-zero external Set-point (296) and it measures a zero If (294) (i.e. the power supply output voltage being too low to operate the LEDs and the current source). It therefore starts increasing the feedback signal (298) until it measures an If that corresponds substantially to the nominal current set in its configuration at 202.

Just prior to reaching 202, as of 208, the Vf 292 started to rise very fast to almost its eventual value due to the LED If/Vf characteristic. When the Vf has reached the 'knee' in the If/Vf characteristic, the If will start rising fast as well, until the controller decides it is at the desired value. Note that the LEDs may be switched ON and OFF by the controller driving parallel switches, e.g. parallel FETs of the LEDs in order to control the desired light output belonging to the set-point. Measurement of If is then done during the ON periods. Note also that the LEDs may be partially switched ON and OFF causing different Vfs during different periods. The driver may be constructed to only optimize the Vsup for the maximum Vf that may occur given the LED-unit's construction or it may be constructed to dynamically follow the variations in Vf due to i.e. short-circuiting an LED that must be in a switched off state in part of the modulation cycle.

Until 210, the situation is static. At 210 the set-point is lowered and (in this example) the controller needs to switch off 1 LED to accommodate that set-point change. As a result the Vf 292 will decrease. A glitch in If (at 260) may be observed as a result of the load change. To optimize efficiency the controller will then lower the feedback voltage 298 to make the Vcs equal to its minimum again. This minimum is reached by lowering Vsup.

It will be understood by the person skilled in the art that Vsup−Vf will always be somewhat larger than Vcs_minimum to have some margin to allow for tolerances and disturbances. Also it will be understood that the circuit will need some time to react to the dynamic changes in Vf and will allow for some timing margin causing Vsup to decrease somewhat later than Vf.

At 212, the set-point increases again, in this example causing the controller to switch back ON LED(s). This causes Vf to rise by the forward voltage of the switched ON LED(s). To accommodate that, the controller has increased the feedback signal at 280, immediately after receiving the higher set-point from the external set-point source. Depending on the speed of reaction of the different components, among which the PSU, the Vsup may have increased in time or it may not have increased enough. In the latter situation a measure could be to delay using the set-point on purpose until 270. Such a delay could be a fixed property of the driver (possibly the delay being configurable), or it could be in only in certain modes. It could even be momentous only when Vf is increasing, but this could cause asynchronisms when multiple lighting fixtures of this type are used in combination.

Typical Case:

The PSU start-up time will be relatively short. The controller will not start-up before its supply, which is derived from the output of the PSU, is sufficient. Furthermore the controller is typically a microcontroller and will need time to initialize. Typically this allows the controller to start operation immediately after initialization, it may assume a stabilized PSU.

Should the controller be faster than the PSU, the controller may measure the PSU output voltage and when this voltage is substantially at its minimum value during 1 or more samples, the controller may conclude the PSU to be stable.

In case the Vf of the LEDs is less than or equal to the "Vsup_minimum−Vhr_minimum"), a current will flow through the LEDs immediately after Vsup is at a sufficient level and all parallel switches are open or serial FETs are closed. It will depend on the value of the set-point during start-up what will happen. When the set-point is at 100%, the Inominal will flow. When the set-point is lower, parallel switches will be closed during parts of the modulation cycle and/or serial switches will be opened (or equivalent mechanisms such as parallel current sources or enabling/disabling/redirecting outputs or enabling/disabling current or voltage sources, etc.). In that case the Vf may be different at different instances in time.

Typically however a driver is constructed in such a manner that it will not cause the LEDs to emit an uncontrolled light flash during start-up. This means that either the current source is disabled or set to 0 milliamps current or all parallel switches are kept closed and series switches opened until the controller is up and ready to start normal operation. This resembles the start-up situation where the Vf is larger than Vsup_minimum: The controller will control the LEDs in a manner that they would radiate light, it will measure the LED current and it will measure current. In case the power supply output voltage would exceed the Vf of the LEDs but not yet provide sufficient voltage to exceed the Vf of the LEDs and to provide sufficient voltage drop over the current source to operate the current source, it will increase the PSU output voltage via the feedback signal until the desired current is measured.

In case of a series LED chain with parallel switches, the Vf will only become lower than the nominal Vf of the entire LED chain and the Vsup will stay at its minimum (no change needed).

In case of a single LED chain that is opened by a series switch, the current source will not be able to send its current into a load and the output voltage of the current source will become substantially equal to its input voltage, thus making the voltage across the current source substantially 0. This will make the controller increase the feedback voltage to its maximum trying to make the PSU output voltage this high that a current will flow again. As this will not happen, the PSU output voltage will go to its maximum value and will stay there. A situation of zero current and a voltage across the current source that is lower than at the minimum operational current can be easily detected and considered as an a-typical situation for which the controller may lower the feedback signal to its minimum and thus prevent maximum voltage in this situation.

The invention claimed is:

1. An LED driver for driving at least one LED, the LED driver comprising:
   a current source configured to generate an LED drive current, and
   a power supply configured to provide a power supply output voltage to the current source,
   the LED driver further comprising a controller configured to measure a voltage drop over the current source and to generate a feedback signal in response to the measured voltage drop,
   the power supply comprising a power supply regulator configured to regulate the power supply output voltage of the power supply between a minimum power supply output voltage and a maximum power supply output voltage, the power supply regulator comprising a power supply regulator input,
   wherein the feedback signal is provided by the controller to the power supply regulator input, the controller being configured to provide the feedback signal in a range from a first feedback signal value representing the minimum power supply output voltage to a second feedback signal value representing the maximum power supply output voltage,
   wherein the power supply regulator is configured to, when the power supply regulator does not receive at the power supply regulator input the feedback signal from the controller, control the power supply to provide the minimum power supply output voltage,
   wherein the controller is configured to at a start-up of the controller provide the feedback signal at the first feedback signal value representing the minimum power supply output voltage, and
   wherein the power supply regulator is configured to, in response to receiving the first feedback signal value, control the power supply to provide the minimum power supply output voltage.

2. The LED driver according to claim 1, wherein a power supply terminal of the controller is connected to a power supply output of the power supply to be powered by the power supply output voltage, the LED driver being configured to:
   start an operation of the power supply when a power supply input voltage to power the power supply is applied to the power supply, the starting of the operation of the power supply providing that the power supply output voltage rises,
   start an operation of the controller when the power supply output voltage has risen to a minimum level required to power the controller,
   the controller being configured to initially provide the first feedback signal value representing the minimum power supply output voltage, when the controller has been powered-up from the power supply output voltage.

3. The LED driver according to claim 1, wherein the power supply regulator comprises a regulator input circuit, electrically connected to the power supply regulator input and configured to set the power supply regulator input to the first feedback signal value when receiving no feedback signal.

4. The LED driver according to claim 1, wherein the controller is further configured to:
   measure a voltage over the at least one LED,
   compare the measured voltage over the at least one LED to a minimum expected value of the voltage over the at least one LED, and
   increase a value of the feedback signal when the voltage over the at least one LED is below the minimum expected value.

5. The LED driver according to claim 4, wherein the controller is further configured to:
   measure a current through the at least one LED, and
   derive the minimum value of the voltage over the at least one LED from the measured current through the at least one LED.

6. The LED driver according to claim 1, wherein the controller is further configured to:
   measure a current through the at least one LED,
   compare the measured current of the at least one LED to a setpoint LED drive current, and
   increase a value of the feedback signal when the measured current of the at least one LED is below the setpoint LED drive current.

7. The LED driver according to claim 6, wherein the LED driver comprises a plurality of parallel switches, each parallel switch to be connected in parallel to a respective at least one LED, the controller being configured to operate the plurality of parallel switches so as to modulate the at least one LED in accordance with a desired LED output, the controller being configured to determine an operating value of the power supply output voltage by driving the plurality of parallel switches to operate in a non-conducting state, the increasing of a value of the feedback signal when the measured current of the at least one LED is below the setpoint LED drive current being performed when the plurality of parallel switches are in the non-conducting state, storing a required value of the power supply output voltage as required to achieve the setpoint LED drive current in a memory of the controller, and the controller being configured to change the feedback signal from the first feedback signal value to a feedback signal value that represents the stored required value of the power supply output voltage after the controller has been started-up and has reached the first feedback signal value, so as to drive the power supply regulator to increase the power supply output voltage from the minimum power supply output voltage to the required value of the power supply output voltage.

8. The LED driver according to claim 7, wherein the controller is configured to, when the required value of the power supply output voltage has been stored in the memory, operate the power supply to remain at or above the required value of the power supply output voltage when at least one of the plurality of parallel switches is in a conductive state.

9. The LED driver according to claim 7, wherein the controller is configured to, when the required value of the power supply output voltage has been stored in the memory, determine a reduced power supply output voltage in accordance with a state of the plurality of parallel switches, and operate the power supply at the reduced power supply output voltage.

10. The LED driver according to claim 1, wherein the controller is configured to compare the measured voltage drop over the current source with a threshold value, and to increase a value of the feedback signal when the measured voltage drop is below the threshold value, the power supply regulator being configured to drive the power supply to increase the power supply output voltage in response to the increase in the value of the feedback signal.

11. The LED driver according to claim 1, wherein the controller is configured to compare the voltage drop over the current source to an upper threshold and reduce the power supply output voltage when exceeding the upper threshold.

12. The LED driver according to claim 1, wherein the feedback signal comprises an analogue feedback signal.

13. The LED driver according to claim 1, wherein the feedback signal comprises a digital feedback signal.

14. A method of driving at least one LED, the method comprising:

generating, by a current source, an LED drive current, providing, by a power supply, a power supply output voltage to the current source, measuring, by a controller, a voltage drop over the current source and generating by the controller a feedback signal in response to the measured voltage drop, regulating, by a power supply regulator, the power supply output voltage of the power supply between a minimum power supply output voltage and a maximum power supply output voltage, the power supply regulator comprising a power supply regulator input, providing by the controller the feedback signal to the power supply regulator input, providing by the controller the feedback signal in a range from a first feedback signal value representing a minimum power supply output voltage to a second feedback signal value representing a maximum power supply output voltage, controlling, by the power supply regulator, the power supply to provide the minimum power supply output voltage when the power supply regulator does not receive at the power supply regulator input the feedback signal from the controller, providing, by the controller at a start up of the controller, the feedback signal at the first feedback signal value representing the minimum power supply output voltage, and controlling by the power supply regulator, in response to receiving the first feedback signal value, the power supply to provide the minimum power supply output voltage.

15. The method according to claim 14, further comprising:

starting an operation of the power supply when a power supply input voltage to power the power supply is applied to the power supply, the starting the operation of the power supply providing that the power supply output voltage rises, starting an operation of the controller when the power supply output voltage has risen to a minimum level required to power the controller from the power supply output voltage, initially providing by the controller the first feedback signal value representing the minimum power supply output voltage, when the controller has been powered-up from the power supply output voltage.

16. The method according to claim 14, further comprising setting the power supply regulator input to the first feedback signal value when receiving no feedback signal.

* * * * *